US009079534B1

(12) United States Patent
Jaziri et al.

(10) Patent No.: US 9,079,534 B1
(45) Date of Patent: Jul. 14, 2015

(54) MARINE MODULAR TRACK AND CAM STORAGE SYSTEM AND RELATED ACCESSORIES (75) Inventors: Chadley T. Jaziri, Merritt Island, FL (US); Aaron King Dale, Cocoa Beach, FL (US)

(73) Assignee: Brunswick Corporation, Lake Forest, IL (US)

( * ) Notice: Subject to any disclaimer, the term of this patent is extended or adjusted under 35 U.S.C. 154(b) by 492 days.

(21) Appl. No.: 13/412,941

(22) Filed: Mar. 6, 2012

(51) Int. Cl.
*B60R 9/02* (2006.01)
*B60R 9/058* (2006.01)

(52) U.S. Cl.
CPC .......................... *B60R 9/02* (2013.01)

(58) Field of Classification Search
CPC ............ B60R 9/02; B60R 9/058; B60R 9/00; B60R 9/045; B60J 7/104; B63B 25/002; B63B 35/815
See application file for complete search history.

(56) References Cited

U.S. PATENT DOCUMENTS

| 3,722,910 | A | | 3/1973 | Heckenlaible | |
|---|---|---|---|---|---|
| 4,148,724 | A | * | 4/1979 | Hannon | 209/403 |
| D257,337 | S | | 10/1980 | Black | |
| 4,805,784 | A | | 2/1989 | Solheim et al. | |
| 4,877,169 | A | * | 10/1989 | Grim | 224/331 |
| 4,899,973 | A | | 2/1990 | Ishida et al. | |
| 5,104,020 | A | * | 4/1992 | Arvidsson et al. | 224/331 |
| 5,201,487 | A | * | 4/1993 | Epplett | 248/298.1 |
| 5,226,570 | A | * | 7/1993 | Pedrini | 224/329 |
| 5,277,346 | A | * | 1/1994 | Stier | 224/509 |
| 5,409,335 | A | * | 4/1995 | Beck | 410/105 |
| 5,419,479 | A | * | 5/1995 | Evels et al. | 224/321 |
| 5,584,521 | A | * | 12/1996 | Hathaway et al. | 296/36 |
| 5,609,278 | A | | 3/1997 | Fresco | |
| 5,730,343 | A | * | 3/1998 | Settelmayer | 224/321 |
| 5,873,463 | A | | 2/1999 | Purcell | |
| 6,164,882 | A | * | 12/2000 | Selle | 410/3 |
| 6,561,117 | B1 | | 5/2003 | Kell | |
| 7,341,231 | B2 | | 3/2008 | Zarn | |
| D601,840 | S | | 10/2009 | Boutin | |
| 7,950,509 | B2 | | 5/2011 | Redzisz | |
| 2007/0194579 | A1 | * | 8/2007 | Fiedler et al. | 292/293 |
| 2007/0284893 | A1 | * | 12/2007 | Davies | 292/336.3 |
| 2011/0139838 | A1 | * | 6/2011 | Sautter et al. | 224/321 |
| 2011/0155777 | A1 | * | 6/2011 | Whiting et al. | 224/401 |
| 2011/0278335 | A1 | * | 11/2011 | Jesewitz et al. | 224/406 |
| 2014/0076947 | A1 | * | 3/2014 | McDonald | 224/401 |

FOREIGN PATENT DOCUMENTS

JP 2006239031 9/2006

* cited by examiner

*Primary Examiner* — Brian D Nash
(74) *Attorney, Agent, or Firm* — Malin Haley DiMaggio & Bowen, P.A.

(57) ABSTRACT

A modular track and cam storage system for marine vessels comprising a track extrusion having a c-channel, and a cam latch assembly comprising a latch, a bolt, and a cam. The cam is substantially rectangular in shape having at least two rounded opposing corners. The cam of the cam latch assembly is configured to be horizontally received in the c-channel of the track extrusion and is configured to be rotated within the c-channel such that the cam is slideably engaged with said track extrusion. Manipulating the latch will cause the cam to rotate, in order or manually engage the cam latch assembly with the track extrusion. The cam is capable of being locked within said c-channel by flipping the latch downward about the bolt. The cam latch assembles are attached to a storage accessory such as a storage bag, a trash bag, a cup holder, a basin, a rod holder.

12 Claims, 14 Drawing Sheets

MARINE MODULAR TRACK AND CAM STORAGE SYSTEM AND RELATED ACCESSORIES

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

1. Field of the Invention

The present invention generally relates to module track and cam storage system and related accessories useful in a marine and boating application.

2. Description of Related Art

In the field of marine vessels, boats, and pleasurecraft, there has been a continuous effort to develop new and useful storage compartments and storage systems due to the relative lack of space aboard such vessels. Typically, storage compartments may be located below the deck, behind and inside seating surfaces, or inside center consoles or cabins. While these compartments are sufficient for general storage, they are not particularly advantageous in commercial and fishing applications, where a boater may need to organize and have easier access to a variety of tools, safety equipment, fishing rods, tackle, and the like. More recently, in several attempts have been made to provide track systems and other moveable storage systems on board marine vessels in an effort to overcome the disadvantages of older, more traditional marine storage systems.

For example, U.S. Pat. No. 7,341,231 to Zarn discloses an accessory mounting system incorporating a track assembly for use on boats. The accessory mounting device includes multiple components, with first and second slide connectors which are positioned within the track assembly. A separate accessory mounting unit includes a bracket portion for sliding engagement over the protruding sections from the slide connectors. The track system is intended to be mounted around the inside of the hull of an exemplary boat.

U.S. Pat. No. 6,561,117 to Kell discloses an accessory mounting track system for boats that allows easy installation, reposition and removal of a variety of marine accessory devices such as rod holders, downriggers, sonar units and the like. This system incorporates an elongated track member having multiple channels, recesses and flanges for sliding engagement with separate slide mounts and a track mounting assembly that secures the member to the boat surface using a "sandwich-style clamping method". There are numerous channels, slides, recesses, grooves and orifices for each of the components of this track system. Once the slide mount is in a desired position a "clamp bolt" is tightened to secure. The track system is intended to be installed along the top of the gunwale or hull of a vessel in order to install and reposition various implements such as rod holders, downriggers, latern holders, cup holders and the like.

U.S. Pat. No. 4,899,973 to Ishidia et al. illustrates a mounting member for supporting a fastening member comprising a substantially horizontal support surface, a pair of elongate webs depending from the support surface and a pair of flanges extending inwardly toward each other defining a slot therein. The fastening member has a rectangular head portion with a pair of sides, an including internal surfaces and flanges with angled sections for insertion of the fastening member into the mounting member. The respective angled surfaces and channel/groove design prevents undesired movement of the head section of a rotational member disposed therein.

While the foregoing patents describe various configurations of track members, they are particularly difficult to use and require an excessive amount of parts and components. Additionally, none are particularly flexible with respect to the types of accessories that can be implemented and none are particularly suited for tool-less installation and application. Accordingly, there is a need in the art for a more robust marine track storage system that is modular, easy to use, durable, high capacity and provides a plurality of interchangeable accessories. It is, therefore, to the effective resolution of the aforementioned problems and shortcomings of the prior art that the present invention is directed. However, in view of the track-style storage systems in existence at the time of the present invention, it was not obvious to those persons of ordinary skill in the pertinent art as to how the identified needs could be fulfilled in an advantageous manner.

SUMMARY OF THE INVENTION

The present invention contemplates a modular track and cam storage system for marine vessels comprising a track extrusion having an elongated body and a C-shaped cross section defining a c-channel and a cam latch assembly comprising a latch, a bolt, and a cam, with the bolt disposed between and connecting the latch and the cam. The cam is substantially rectangular in shape having at least two rounded opposing corners. The cam of the cam latch assembly is configured to be horizontally received in the c-channel of the track extrusion and is configured to be rotated within the c-channel such that the cam is slideably engaged with said track extrusion. The latch of the cam assembly is pivotably mounted to the bolt and the bolt is received in a central bore of the cam. Accordingly, manipulating the latch will cause the cam to rotate, in order or manually engage the cam latch assembly with the track extrusion. The cam is capable of being locked within said c-channel by flipping the latch downward about the bolt. One or more pieces of the track extrusion can be mounted to the gunwale of a vessel or other appropriate structure in order to provide a modular sliding storage system.

One or more cam latch assembles are provided on or attached to a storage accessory such as a storage bag, a trash bag, a cup holder, a basin, a rod holder, or other similar accessories. In one embodiment, the accessory comprises a convenient collapsible storage bag defined as a dual-chambered storage bag including a bifurcated rear plate and two chambers, wherein the bi-furcated rear plate includes a fold line wherein the storage bag can be folded and collapsed about the fold line. In some embodiments, a washer is provided between the rear plate of the storage bag (or other accessory) and the cam.

Accordingly, it is an object of the present invention to provide a module track and cam assembly for marine vessels that is easy to operate, secure, and flexible with respect the types of accessories that may be utilized.

It is another object of the present invention to provide a storage system that is particularly useful on marine vessels and intended to be mounted on or under the gunwale of such a vessel.

It is another object of the present invention to provide a storage system that utilizes storage accessories having removably engagable cam latch assemblies which engage an elongated track extrusion to provide a sliding storage accessory system.

In accordance with these and other objects which will become apparent hereinafter, the instant invention will now be described with particular reference to the accompanying drawings.

DETAILED DESCRIPTION

Figure 1A:
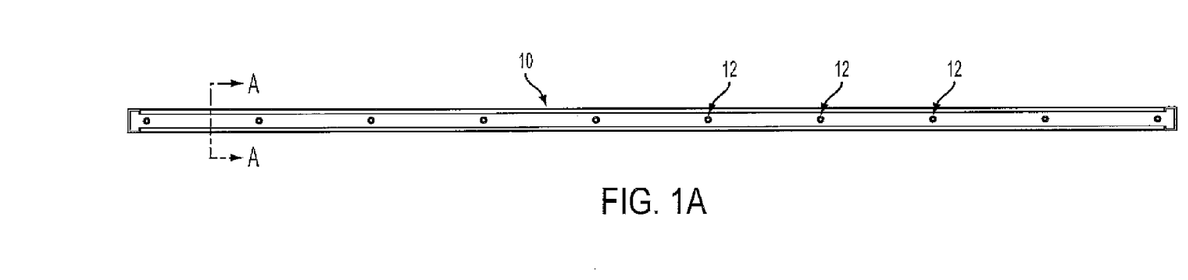
FIGS. 1A-1C are various views of one embodiment of the track extrusion of the present invention.
Figure 1B:
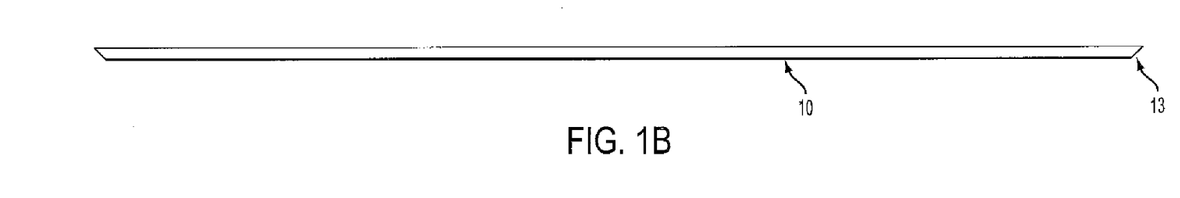
Figure 1C:
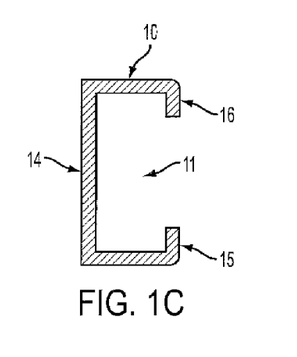

FIGS. 1A-1C depict one embodiment of the track extrusion 10 of the present invention. As shown, track extrusion 10 comprises an elongated extruded member of any desired length and having a width substantially smaller than the extruded length. With reference to FIG. 1C, track extrusion 10 has a "C" shaped cross-section defining a c-channel 11. Track extrusion 10 is configured to be attached to the topside or underside of the gunwale (i.e. side wall) of a vessel. Accordingly, track extrusion 10 includes a plurality of mounting holes 12 bored through its base wall 14. C-channel 11 includes two opposing engaging lips 15 and 16. In some embodiments, track extrusion 10 comprises a relatively flexible material such that it can be attached to curved and other irregular surfaces. To that end, in some embodiments, it is desirable to install a plurality of track extrusion 10 sections in end-to-end fashion in order to better fit around curves and other structure features. Accordingly, either end of track extrusion 10 may include a bevel 13 which promotes a tight seam and secure connection between adjacent and adjoining sections. In the present invention, varying configurations of track extrusion 10 sections may be implemented depending on the structure of the vessel and the desired design application; it is in that sense that the present invention is "modular."

Figure 2:
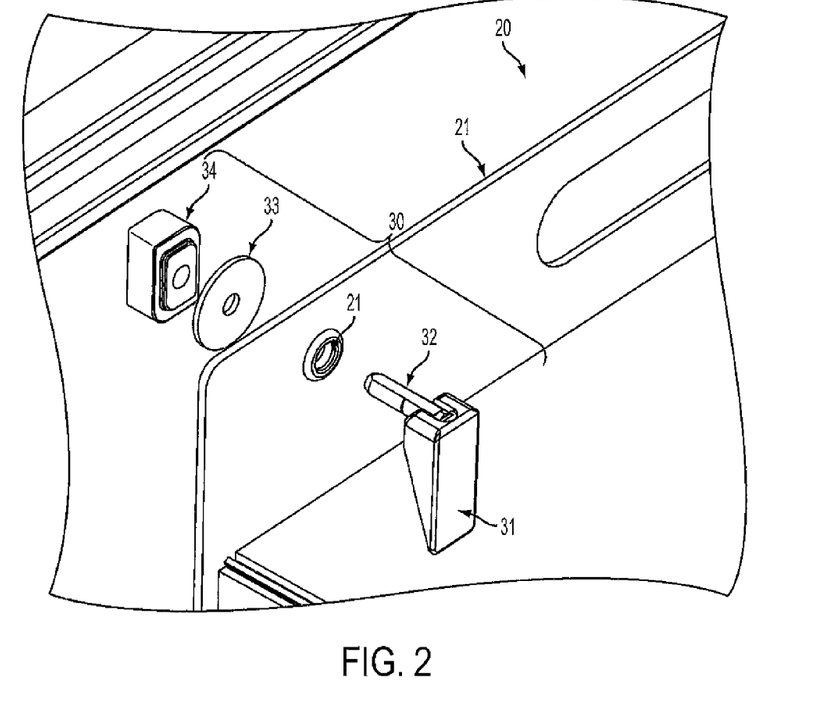
FIG. 2 is an exploded perspective view of one embodiment of the cam latch assembly of the present invention.
Figure 3:
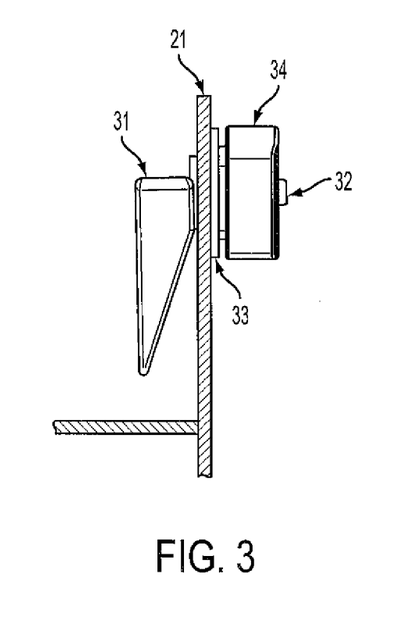
FIG. 3 is a side view of one embodiment of the cam latch assembly of the present invention in an assembled state.

The c-channel 11 of track extrusion 10 is configured to slideably engage a plurality of various accessories such as storage bags, storage containers, mounting cleats, rod holders, cup holders, and the like. Accordingly, with reference to FIG. 2 shown is an exemplary accessory 20 configured as a storage box. Accessory 20 includes a relatively planar rear plate 21. Disposed through rear plate 21 is a cam latch assembly 30. In some embodiments, cam latch assembly 30 comprises a latch 31 having a bolt 32, a washer 33, and a cam 34. As shown, bolt 32 is pivotably mounted to latch 31. Rear plate 21 of accessory 20 is disposed between latch 31 and washer 33 and washer 33 is disposed between rear plate 21 and cam 34. Accordingly, rear plate 21 is secured between latch 31 and cam 34 with bolt 32 penetrating through rear plate 21, washer 33 and cam 34, in order to provide a tighter fit when engaged with track extrusion 10. In some embodiments, bolt 32 is disposed through aperture 22 of rear plate 21. FIG. 3 is a side sectional view of the configuration shown in FIG. 2, showing the above components in assembled fashion. As shown, bolt 32 is disposed through cam 34, and in some cases extends beyond cam 34 such that the end of bolt 32 actually touches the wall of c-channel 11, providing a more secure engagement. As will be described in detail below, cam 34 is configured to be received in and slideably engaged with c-channel 11 of track extrusion 10.

Figure 4A:
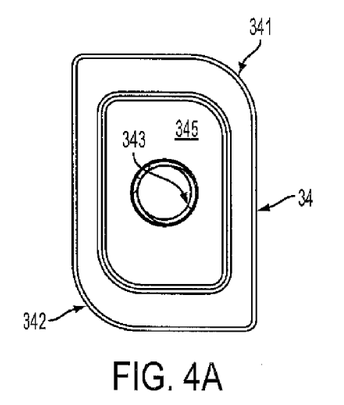
FIGS. 4A-4F are various views of one embodiment of the cam of the present invention.
Figure 4B:
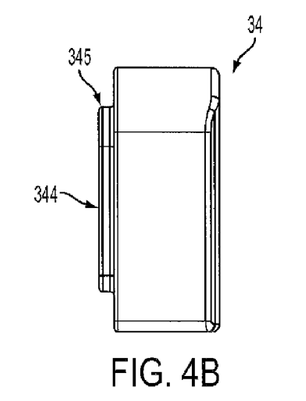
Figure 4C:
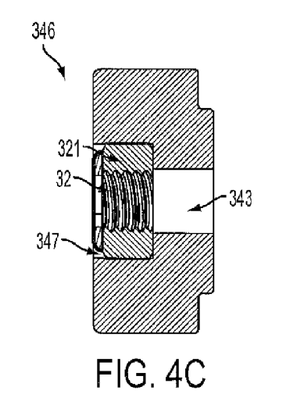
Figure 4D:
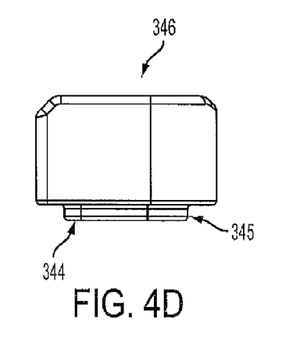
Figure 4E:
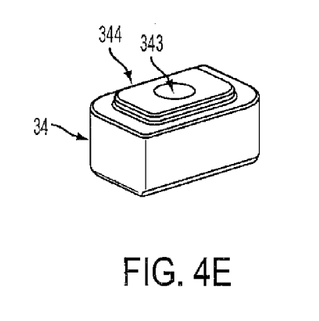
Figure 4F:
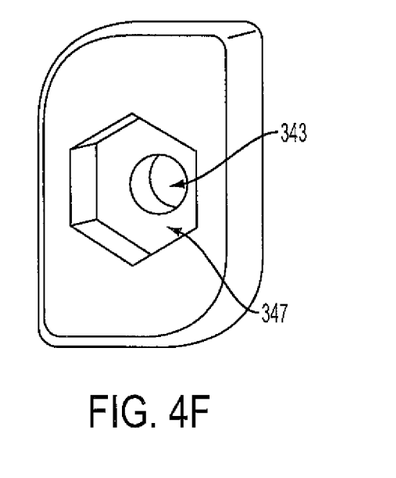

FIGS. 4A-4E present various detailed views of cam 34, which is configured to engage track extrusion 10. As shown in FIG. 4A, in some embodiments, cam 34 has a generally rectangular shape however at least two of the opposing corners 341 and 342 are rounded. Cam 34 also includes a central bore 343 which is configured to receive bolt 32 of the cam latch assembly 30. Turning to FIG. 4B, at least front side 344 of cam 34 includes a raised step 345. In some embodiments, the surface area of raised step 345 is less than the overall surface area of side 344. FIG. 4C is a sectional view of cam 34 taken from the side. Rear side 346 includes a recess 347 which is coaxial with bore 343. Bolt 32 is received in bore 343 and is secured by a locknut 321 which fits inside recess 347. In some cases recess 347 is substantially hexagonal and locknut 321 is also hexagonally shaped in order to provide a secure fitment between the locknut 321 and bolt 32. FIGS. 4D-4F are additional views demonstrating the features discussed above, which FIG. 4F depicting a hexagonal recess 347.

Figure 5A:
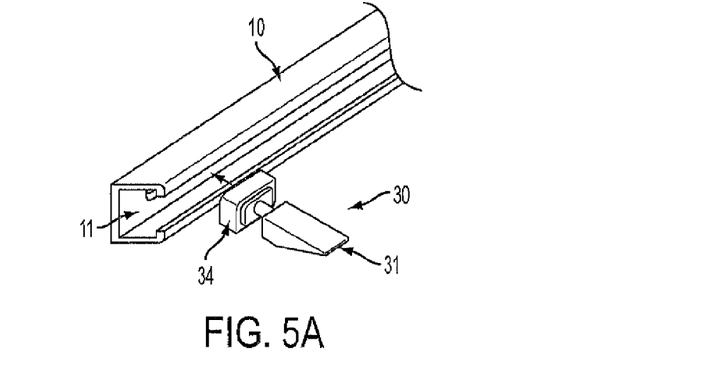
FIGS. 5A-5C are views of various stages of installation of the cam latch assembly into the track extrusion.
Figure 5B:
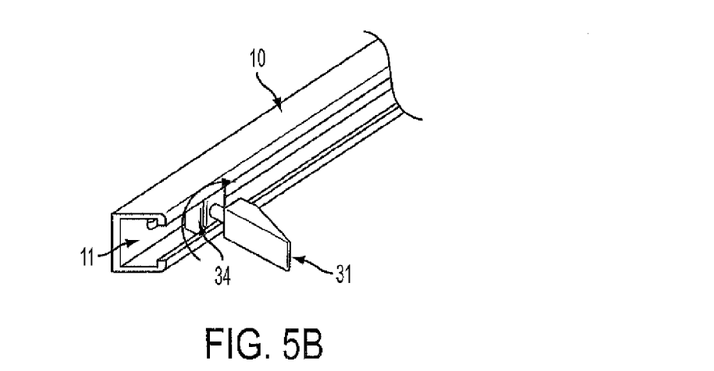
Figure 5C:
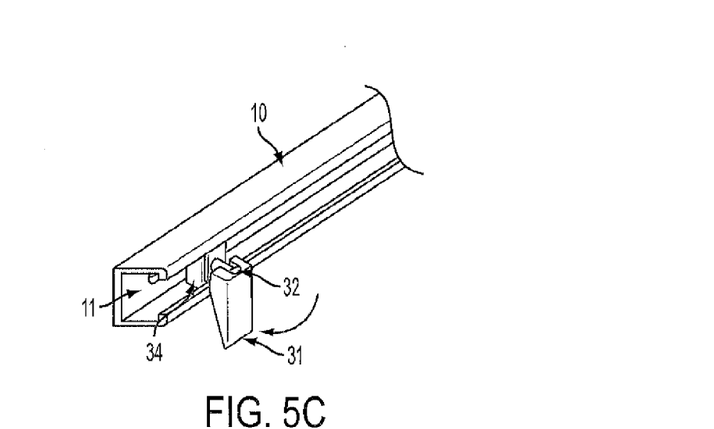

FIGS. 5A-5C and FIG. 6 demonstrate the manner in which cam latch assembly 30 is received in and slidingly engaged with track extrusion 10. First, cam 34 is introduced into c-channel 11 of track extrusion 10 in a horizontally disposed fashion. Accordingly, in some embodiments, the width of cam 34 is slightly smaller than the height of c-channel 11. After cam 34 has been horizontally inserted into c-channel 11, latch 31 is twisted or rotated clockwise such that cam 34 likewise rotates clockwise. In some cases, cam 34 is rotated 90 degrees from its initial position such that cam 34 is now vertically disposed within c-channel 11. Consequently, the aforementioned rounded corners 341 and 342 assist in the rotation action of cam 34 inside c-channel 34. In this position, cam 34 is slidingly engaged with c-channel 11 such that it can be longitudinally repositioned along the track extrusion 10 as desired; however, the cam 34 is retained by engaging lips 15 and 16 so that it does not disengage from or fall out of c-channel 11 (See FIG. 6). In some embodiments, lips 15 and 16 engage cam 34 at the top of bottom of raised step 345, which further secures the engagement. To lock cam assembly 30 into position, as shown in FIG. 5C, latch 31 is rotated further clockwise and is flipped downward about bolt 32, which secures the cam assembly (and the accessory to which the cam assembly 30 is attached). If repositioning is desired, the latch is simply flipped upward, which releases cam 34 slightly, allowing it slide within c-channel 11 but not disengage the track extrusion 10 entirely.

Figure 6:
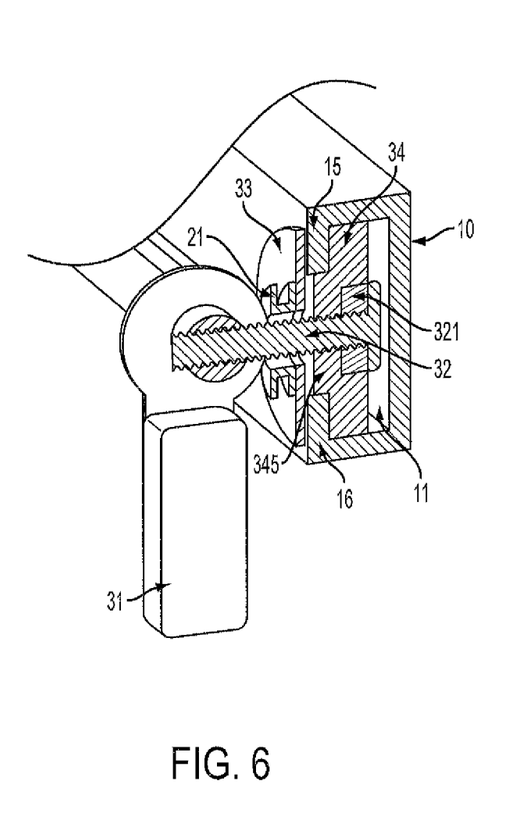
FIG. 6 is a side perspective view of the engagement of the cam latch assembly and the track extrusion.
Figure 7A:
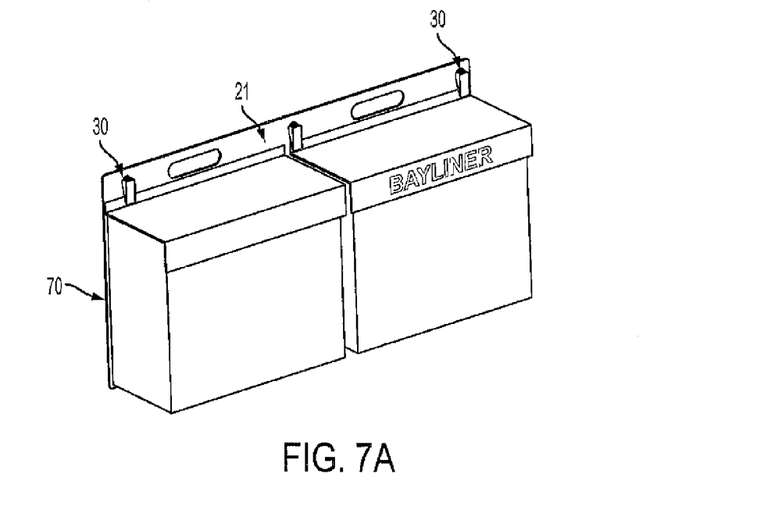
FIG. 7A is a perspective view of one type of accessory that may be used with the present track system, configured as a dual-chambered storage bag.
Figure 7B:
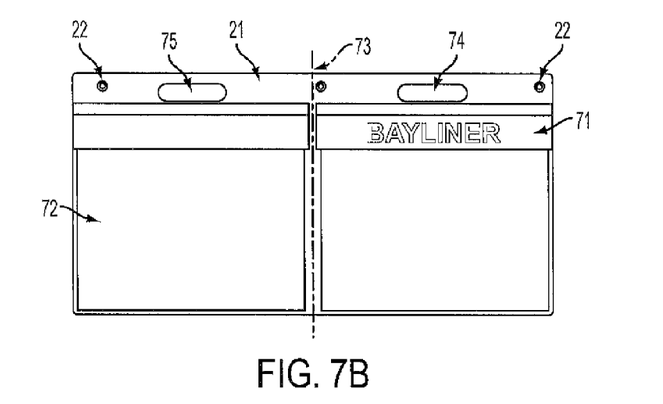
FIG. 7B is a front view of one type of accessory that may be used with the present track system, configured as a dual-chambered storage bag.

FIG. 6 is a cross-sectional view of the cam latch assembly 30 with cam 34 engaged with c-channel 11 of track extrusion 10. In this view, washer 33 is show in contact with the outside of each of the engaging lips 15 and 16 such that the engaging lips 15 and 16 are disposed between the washer 33 and the front side 344 of cam 34. Step 345 is shown as riding between the engaging lips 15 and 15 such that cam 34 resists rotational movement inside c-channel 11. Step 345 also limits how tight the cam latch assembly 30 can be secured within c-channel 11, preventing over tightening or deformation of the track 10 or assembly 30. In some embodiments, rotating latch 31 causes bolt 32 to also rotate, which will cause bolt 32 to tighten within locknut 321. In some embodiments, the locknut 321 can be omitted, with bolt 32 simply being threaded into cam 34. The locknut 321, however, provides a more secure engagement. Continuing to rotating latch 31 and bolt 32 therefore will cause a locking fitment of cam 34 within c-channel 11. Loosening latch 31 and bolt 32 slightly will allow the cam latch assembly 30 to slide within c-channel 11 for repositioning.

FIGS. 7-16 depict various embodiments of accessories that can be utilized with the track system of the present invention. Each of the accessories, with the exception of the cleat shown in FIG. 11, includes at least one cam latch assembly 30, and in some cases include a plurality of cam latch assemblies 30. FIG. 7A depicts a dual-chamber storage bag 70 supported by a rear plate 21 including two cam latch assemblies 30. FIG. 7B is a front view of the dual-chamber storage bag 70 shown in FIG. 7A. In some embodiments, storage bag 70 comprises two chambers 71 and 72 which may be comprised of a rigid material or a soft/flexible material. The rear plate 21 is substantially rigid and includes two apertures 22 through which the cam latch assemblies 30 are received (FIG. 7A). Rear plate 21 is bifurcated at fold line 73 and, in some embodiments, a more flexible material, such as cloth, may be disposed along fold line 73, between the two rigid pieces of rear plate 21. Storage bag 70 is configured to fold and collapse along fold line 73 such that the two pieces of rear plate 21 face back-to-back and the two storage chambers 71 and 72 are opposing. In some embodiments, rear plate 21 may also include two openings 74 and 75 which define handles for the bag 70. In the folded position, the openings 74 and 75 are co-incident, defining a single handle. The cam latch assemblies 30 may be staggered to allow for easier folding and carrying because the rear plate 21 portions can abut flush to one another. Accordingly bag 70 may define a foldable, collapsible storage bag that can be folded for carrying and storage when the bag is not slideably engaged with the track system of the present invention. When one desires to engage the bag 70 with the track system, the bag is simply unfolded and the cam assemblies 30 are engaged with the track extrusion 10 in accordance with the above discussion.

Figure 8:
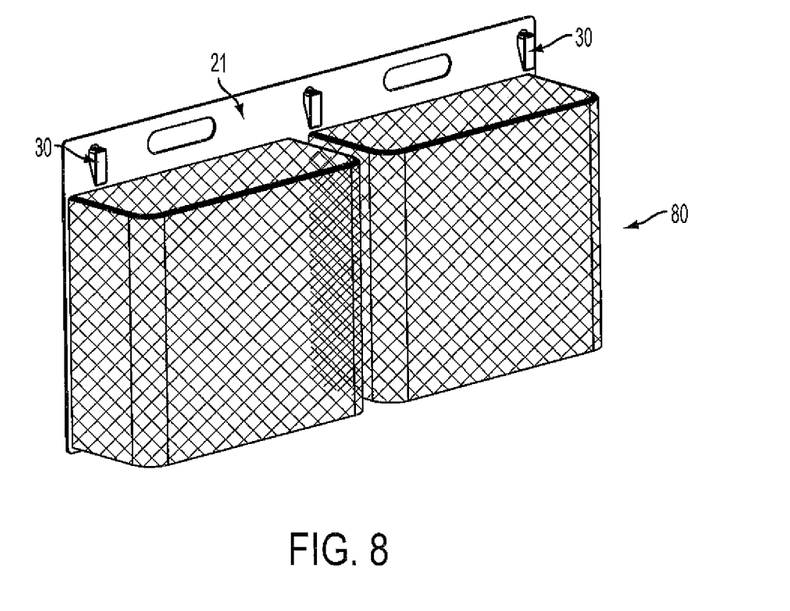
FIG. 8 is a perspective view of another type of accessory that may be used with the present track system, configured as a dual-chambered mesh storage bag.
Figure 9:
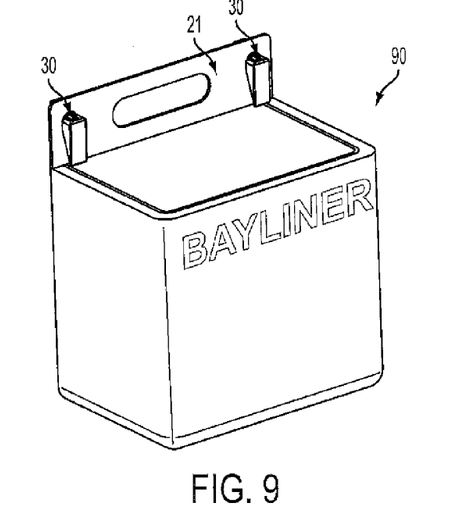
FIG. 9 is a perspective view of another type of accessory that may be used with the present track system, configured as a single-chambered insulated and water resistant storage bag.
Figure 10:
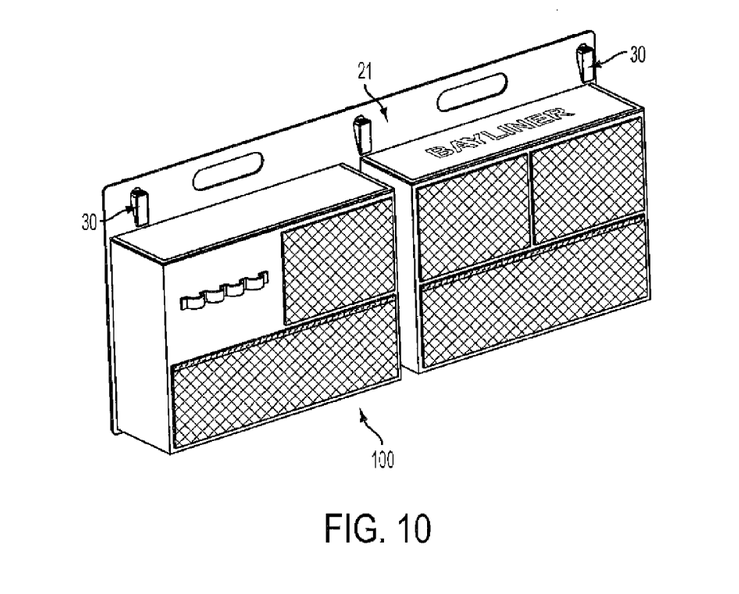
FIG. 10 is a perspective view of another type of accessory that may be used with the present track system, configured as a dual-chambered modified mesh and canvas storage bag.

FIG. 8 depicts a dual-chamber mesh bag 80 in similar configuration to storage bag 70, supported by a rear plate 21 including two cam latch assemblies 30. FIG. 9 depicts a single-chamber storage bag 90 supported by a rear plate 21 including two cam latch assemblies 30. Storage bag 90 may be configured as an insulated and/or water resistant bag, such as a cooler bag or lunch bag intended to contain ice, food, and drinks. FIG. 10 depicts a dual-chamber multi-function storage tote 100 supported by a rear plate 21 including two cam latch assemblies 30. The embodiments shown in FIG. 8 and FIG. 10 may be configured to have a central fold line along the rear plate 21, similar to that shown in FIG. 7B. Accordingly, the storage chambers may have varying configurations and may comprise a variety of rigid, semi-rigid, and flexible materials.

Figure 11A:
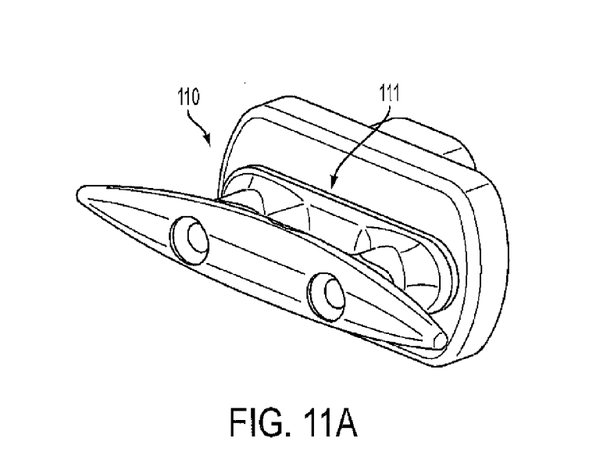
FIG. 11 is a perspective view of another type of accessory that may be used with the present track system, configured as mounting cleat.
Figure 11B:
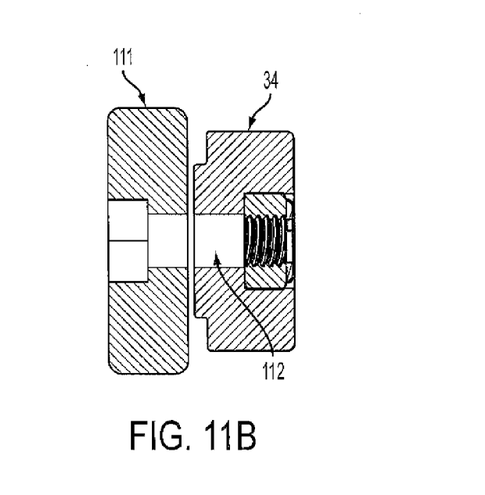

FIGS. 11A and 11B show a cleat 110 which includes a rear plate 111 which is configured to engage a cam 34 much like latch 31 would. A bolt 112 is disposed through plate 111 and into cam 34. In this embodiment, the entire cleat 110 can be rotated similar to a door knob in order to secure cam 34 within track extrusion 10. Accordingly, can 34 is engaged directly with the rotatable cleat 110.

Figure 12:
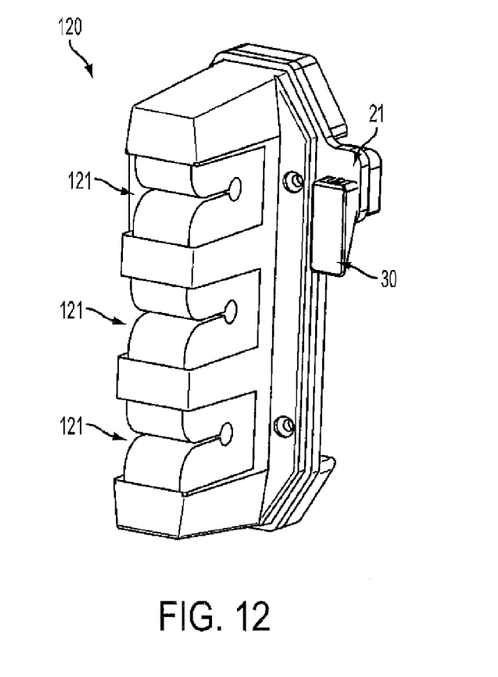
FIG. 12 is a perspective view of another type of accessory that may be used with the present track system, configured as a rod holder.

FIG. 12 depicts a rod holder 120 having a rear plate 21 and including at least one cam latch assembly 30, but may include two cam latch assemblies 30 on either side thereof. Rod holder 120 includes a plurality of rod holder clamps 121 which can removably receive and secure the shaft of a fishing rod or similar implement. In some cases, two such rod holders 120 can be attached to track extrusion 10 such that one can support the tip of a rod or other implement and one can support the butt-end of a rod or other implement. A protrusion on the bottom rear of rod holder 120 is configured to press against the hull or side-wall of the vessel to provide additional stability and support for the rod holder 120 while engaged with track 10.

Figure 13:
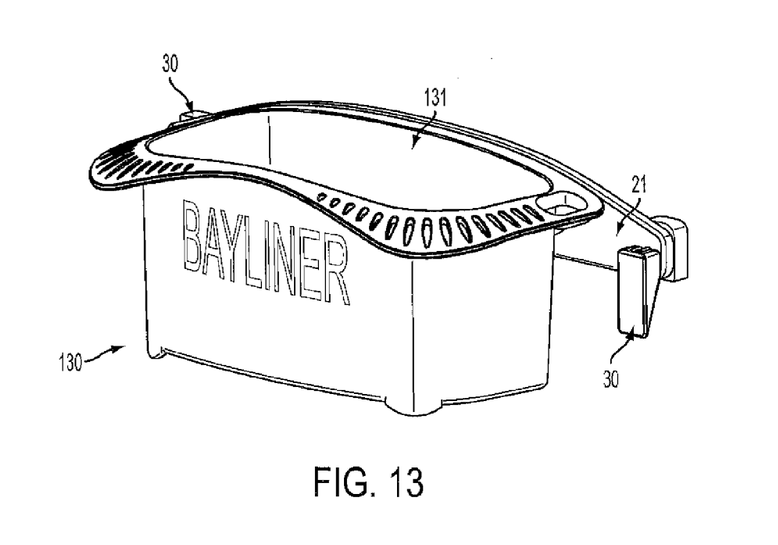
FIG. 13 is a perspective view of another type of accessory that may be used with the present track system, configured as basin.
Figure 14:
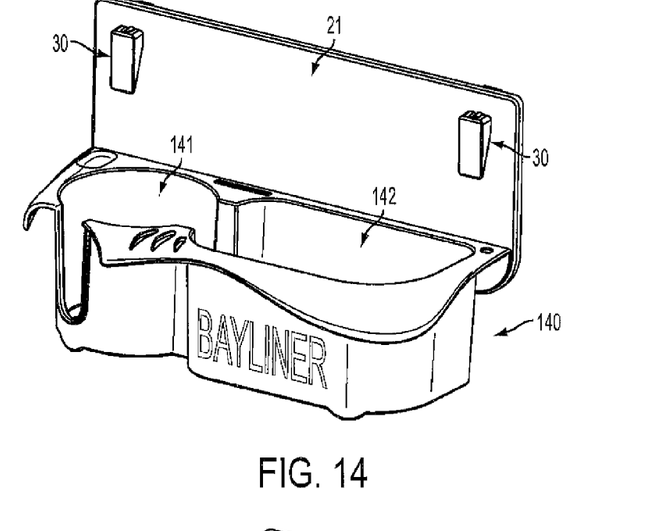
FIG. 14 is a perspective view of another type of accessory that may be used with the present track system, configured as a cup holder.

FIG. 13 depicts a basic container 130 configured as having a basin or cavity 131 supported by a rear plate 21 for retaining various items and on-board accessories. In some cases, container 130 includes cam latch assemblies 30 on either side thereof to provide stability. FIG. 14 depicts a similar device to that in FIG. 14 however it is configured as a cup holder 140. The cup holder 140 is supported by a rear plate 21 includes a cup recess 141 and an accessory cavity 142. Included also are two can latch assemblies 30.

Figure 15:
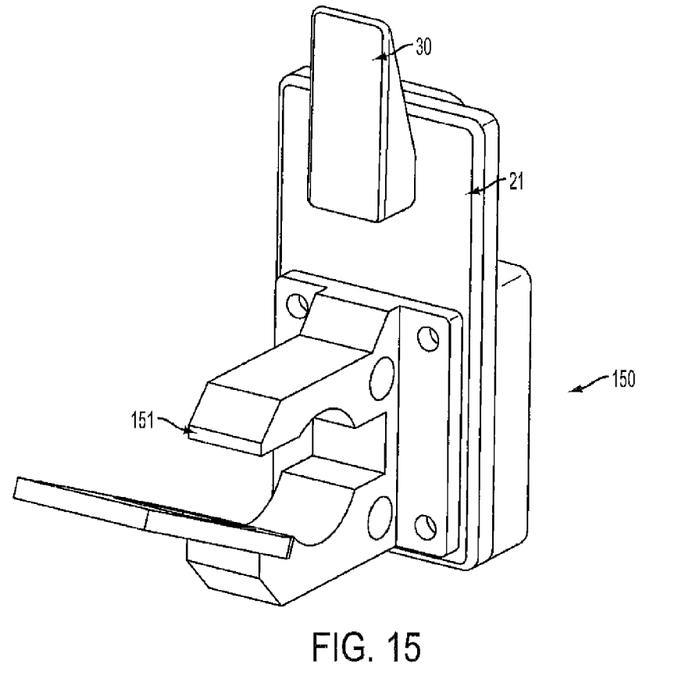
FIG. 15 is a perspective view of another type of accessory that may be used with the present track system, configured as a general purpose clamp.

FIG. 15 depicts a general purpose clamp 150 supported by a rear plate 21 including a releasable clamp mechanism 151 and one latch assembly 30. A protrusion on the bottom rear of rear plate 21 is configured to press against the hull or side-wall of the vessel to provide additional stability and support for the clamp 150 while engaged with track 10.

Figure 16:
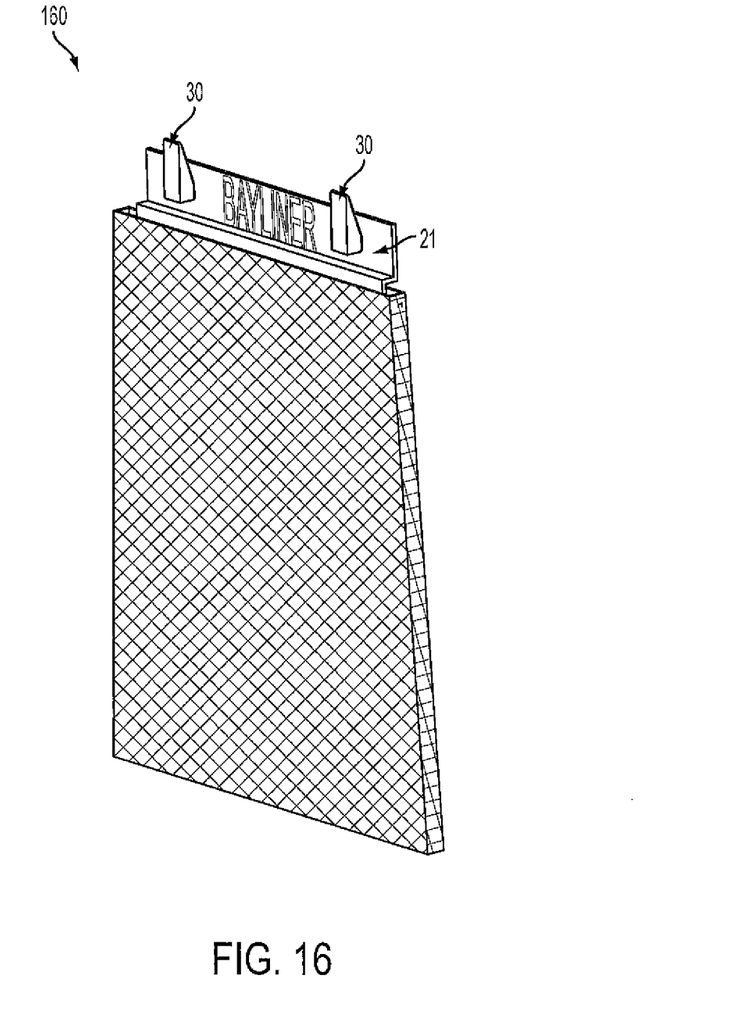
FIG. 16 is a perspective view of another type of accessory that may be used with the present track system, configured as a mesh trash bag.

Finally, FIG. 16 depicts a general purpose mesh trash bag 160 supported by a rear plate 21 including two latch assemblies 30. It is appreciated and understood that a variety of accessories can be implemented provided each incorporates at least one cam latch assembly 30. In many instances, a rear plate 21 is also needed to provide adequate support for the accessory 20, however the size, shape, and configuration of the rear plate 21 can vary depending on the design as shown in the various rear plates 21 shown in FIGS. 7-16.

It is appreciated and understood that the various components of the present invention can comprise a variety of suitable materials including metal, plastic, resins, and other composites. It is preferable that many of the selected materials be resistant to rust and oxidation since the system is intended for use on a marine vessel; however, other suitable material properties may be utilized without departing from the scope of the present invention. Additionally, while it has been discussed that the present track system is ideal for placement at or under the gunwale of a vessel on the inside of vessel's cockpit, the present invention may be suitable in a number of other applications and need not be limited to specific use on marine vessels.

The instant invention has been shown and described herein in what is considered to be the most practical and preferred embodiments. It is recognized, however, that departures may be made therefrom within the scope of the invention and that obvious modifications will occur to a person skilled in the art.

What is claimed is:

1. A modular storage and track system or marine vessels, comprising:
   a track extrusion having an elongated body and a C-shaped cross section defining a c-channel, said track system for receiving modular storage accessories;
   a cam latch assembly comprising a latch, a bolt, and a cam, said bolt disposed between and connecting said latch and said cam;
   said cam substantially rectangular in shape having at least two rounded opposing corners;
   said cam of said cam latch assembly being configured to be horizontally received in said c-channel of said track extrusion and rotated within said c-channel such that said cam is slideably engaged with said track extrusion;
   said latch being pivotably mounted to said bolt and said bolt is received in a central bore of said cam;
   wherein rotation of said latch causes rotation of said cam; and
   said cam being locked within said c-channel by flipping said latch downward about said bolt.

2. The modular storage system of claim 1, wherein said cam latch assembly is attached to a storage accessory.

3. The modular storage system of claim 2, wherein said storage accessory comprises a storage bag.

4. The modular storage system of claim 3, wherein said storage bag comprises a dual-chambered storage bag including a bi-furcated rear plate and two chambers, said bi-furcated rear plate including a fold line wherein said storage bag can be folded and collapsed about said fold line.

5. The modular storage system of claim 2, wherein said storage accessory comprises a trash bag.

6. The modular storage system of claim 2, wherein said storage accessory comprises a rod holder.

7. The modular storage system of claim 2, wherein said storage accessory comprises a cup holder.

8. The modular storage system of claim 2, wherein said storage accessory comprises a clamp.

9. The modular storage system of claim 2, wherein said storage accessory comprises a mounting cleat.

10. The modular storage system of claim 2, wherein said storage accessory comprises a storage basin.

11. The modular storage system of claim 1, wherein said track extrusion includes a plurality of mounting holes.

12. The modular storage system of claim 1, wherein said marine vessels includes one or more gunwales, and one or more of said track extrusions are disposed around at least one said gunwale of said marine vessel.

* * * * *